(12) United States Patent
Underhill et al.

(10) Patent No.: US 11,518,258 B2
(45) Date of Patent: Dec. 6, 2022

(54) HOLSTER SENSOR FOR ELECTRIC VEHICLE CHARGING SYSTEM

(71) Applicant: Rivian IP Holdings, LLC, Plymouth, MI (US)

(72) Inventors: Kyle R. Underhill, Los Angeles, CA (US); Silva Hiti, Redondo Beach, CA (US); Steven E. Schulz, Torrance, CA (US); Tyler J. Erikson, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 100 days.

(21) Appl. No.: 17/076,355

(22) Filed: Oct. 21, 2020

(65) Prior Publication Data
US 2022/0118869 A1    Apr. 21, 2022

(51) Int. Cl.
*B60L 53/30*    (2019.01)
*B60L 53/68*    (2019.01)
*B60L 53/16*    (2019.01)

(52) U.S. Cl.
CPC ............ *B60L 53/305* (2019.02); *B60L 53/16* (2019.02); *B60L 53/68* (2019.02); *B60L 2250/20* (2013.01)

(58) Field of Classification Search
CPC ........ B60L 53/305; B60L 53/68; B60L 53/16; B60L 2250/20
USPC ........................................................ 320/109
See application file for complete search history.

(56) References Cited

U.S. PATENT DOCUMENTS

| 7,804,274 | B2 * | 9/2010 | Baxter | B60L 53/665 |
| | | | | 414/281 |
| 8,025,526 | B1 * | 9/2011 | Tormey | H01R 13/6397 |
| | | | | 439/372 |
| 8,506,315 | B2 * | 8/2013 | Canedo | B60L 53/305 |
| | | | | 439/372 |
| 9,827,950 | B2 * | 11/2017 | Lovett | E05B 81/56 |
| 10,800,378 | B1 * | 10/2020 | Drayna | G06F 21/554 |
| 2010/0301802 | A1 * | 12/2010 | Iida | B60L 53/18 |
| | | | | 320/109 |
| 2012/0007554 | A1 * | 1/2012 | Kanamori | B60L 53/65 |
| | | | | 320/109 |
| 2012/0135626 | A1 * | 5/2012 | Tormey | B60L 3/0069 |
| | | | | 320/109 |

(Continued)

FOREIGN PATENT DOCUMENTS

| EP | 2863488 | A1 * | 4/2015 | ............. B60L 53/16 |
| JP | H10117405 | A  * | 5/1998 | |

(Continued)

*Primary Examiner* — Suresh Memula
(74) *Attorney, Agent, or Firm* — Clements Bernard Baratta; Christopher L. Bernard

(57) ABSTRACT

Various disclosed embodiments include illustrative electrical power dispensers for electrical vehicle charging systems, charging systems, and methods of sensing presence of a charge coupler in a holster of an electrical power dispenser. In an illustrative embodiment, an electrical power dispenser for an electrical vehicle charging system includes a housing. A charge coupler is configured to dispense direct current electrical power. A holster is disposed on the housing and is configured to receive the charge coupler therein. A holster sensor is configured to sense presence of the charge coupler in the holster and is further configured to generate a signal indicative of presence of the charge coupler in the holster.

20 Claims, 8 Drawing Sheets

(56) References Cited

U.S. PATENT DOCUMENTS

| | | | | |
|---|---|---|---|---|
| 2013/0249485 A1* | 9/2013 | Bohm | ................... | B60L 53/11 |
| | | | | 320/109 |
| 2014/0267712 A1* | 9/2014 | Foerster | ............... | H04N 7/188 |
| | | | | 340/568.3 |
| 2015/0048791 A1* | 2/2015 | Veiga | ................... | B60L 53/16 |
| | | | | 320/109 |
| 2017/0018888 A1* | 1/2017 | Takagi | ................. | B60L 53/16 |
| 2017/0237944 A1* | 8/2017 | Haas | ................... | G06Q 20/14 |
| | | | | 348/143 |

FOREIGN PATENT DOCUMENTS

| | | | | |
|---|---|---|---|---|
| JP | 2013046477 A * | 3/2013 | .......... | B60L 11/1818 |
| WO | WO-2011133723 A2 * | 10/2011 | .......... | B60L 11/1818 |
| WO | WO-2013061120 A1 * | 5/2013 | .............. | B60L 53/16 |
| WO | WO-2013090930 A1 * | 6/2013 | .......... | B60L 11/1818 |

\* cited by examiner

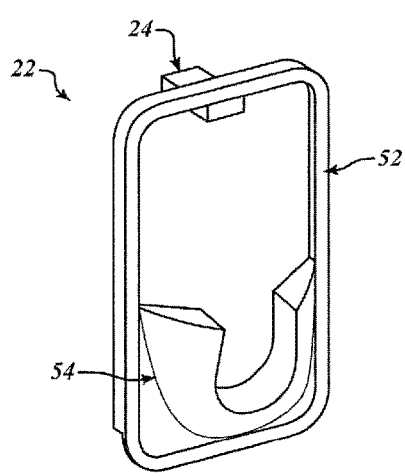 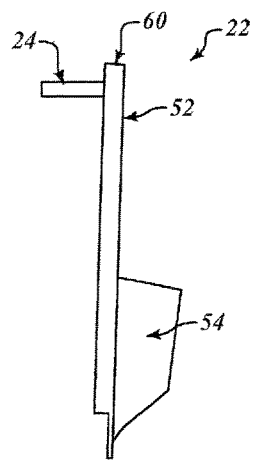 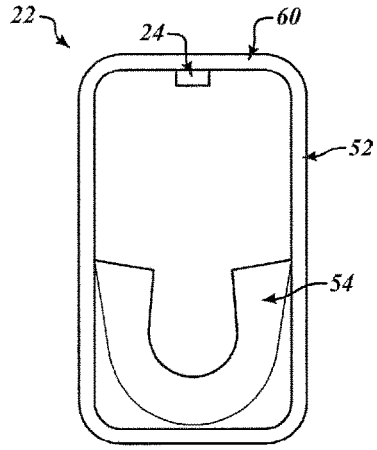
*FIG.4A*  *FIG.4B*  *FIG.4C*

HOLSTER SENSOR FOR ELECTRIC VEHICLE CHARGING SYSTEM

INTRODUCTION

The present disclosure relates to charging of electrical vehicles. The statements in this section merely provide background information related to the present disclosure and may not constitute prior art.

With widespread use of electric vehicles comes greater need for charging resources and standardization. Providing power to an electric vehicle's battery is accomplished by converting alternating current (AC) to direct current (DC). Such conversion is key to how quickly and efficiently an electric vehicle's battery can be charged. Electric Vehicle Supply Equipment (EVSE) is one standard used for vehicle charging equipment.

In Level 1 charging, 120 VAC is supplied at 12-16 A to the EVSE and is, in turn, supplied to an electric vehicle. The EVSE handles communication, but AC voltage is converted to DC voltage via a 1.5 KW AC-to-DC converter onboard the electric vehicle. With Level 1 charging, around 1.6 miles of range are added per hour of charging.

In Level 2 charging, 240 VAC is supplied at 12-80 A to the EVSE and is, in turn, supplied to an electric vehicle. The EVSE also handles communication, and AC voltage is converted to DC voltage via an 11 KW AC-to-DC converter onboard the electric vehicle. With Level 2 charging, around 13 miles of range are added per hour of charging.

In Level 3 charging (DC fast charging), AC electrical power is supplied from the electrical grid to the EVSE. The EVSE also handles communication, but AC voltage is converted to DC voltage via an AC-to-DC converter that is disposed in the EVSE and that can have a rating of greater than 200 KW. With Level 3 DC fast charging, the AC-to-DC converter onboard the electric vehicle is bypassed, and up to around 195 miles of range are added per hour of charging. As such, Level 3 DC fast charging may be considered to be desirable for public charging infrastructure (such as charging stations for fleets of private vehicles and that are also available for use by the public—hereinafter referred to as public charging stations).

EVSE typically includes a power cabinet that receives AC electrical power from the grid and converts the grid AC electrical power to DC electrical power. The power cabinet provides the DC electrical power to at least one dispenser. Each dispenser includes a charge coupler that is electrically connected to the dispenser and that is electrically connectable to the electric vehicle to dispense DC electrical power to the electric vehicle.

Not all private fleet operators and not all public users may replace the charge coupler in its holster in the dispenser after use. In such cases, the charge coupler may hang freely and the charge coupler and its associated cable may lie on the ground. In some such cases, the charge coupler may be exposed to inclement weather and may lie on the ground in water or snow, thereby presenting the possibility of introducing electrical shorts in the charge coupler. In some other such cases, the charge coupler and/or the cable that connects the charge coupler with its associated dispenser may be left on the ground in the path of vehicles and could be run over by vehicles, thereby presenting the possibility of introducing electrical shorts in and/or physical damage to the charge coupler and/or the cable. To that end, field service data shows that broken cables (that connect charge couplers to their dispensers) account for a majority of field service visits and replacement costs for public charging infrastructure.

Currently-known efforts to address broken cables that connect charge couplers to their dispensers include shortening the cables and include use of cable retractor systems. In some cases in which cables are shortened and a charge coupler is not returned to its holster after use, the charge coupler may be suspended above the ground. In such cases, weight of the charge coupler and the cable is supported only by the physical connection between the dispenser and the cable. This weight can impart undue stress and resultant strain on the cable, thereby possibly helping contribute to damage to or failure of the cable.

BRIEF SUMMARY

Various disclosed embodiments include illustrative electrical power dispensers for electrical vehicle charging systems, charging systems, and methods of sensing presence of a charge coupler in a holster of an electrical power dispenser.

In an illustrative embodiment, an electrical power dispenser for an electrical vehicle charging system includes a housing. A charge coupler is configured to dispense direct current electrical power. A holster is disposed on the housing and is configured to receive the charge coupler therein. A holster sensor is configured to sense presence of the charge coupler in the holster and is further configured to generate a signal indicative of presence of the charge coupler in the holster.

In another illustrative embodiment, a charging system includes a power cabinet having at least one direct current power module. An electrical power dispenser is electrically coupled to the power cabinet. The dispenser includes a housing. A charge coupler is configured to dispense direct current electrical power. A holster is disposed on the housing and is configured to receive the charge coupler therein. A holster sensor is configured to sense presence of the charge coupler in the holster and is further configured to generate a signal indicative of presence of the charge coupler in the holster.

In another illustrative embodiment, a method is provided for sensing presence of a charge coupler in a holster of an electrical power dispenser. Presence of a charge coupler in a holster of an electrical power dispenser is sensed. A signal indicative of presence of the charge coupler in the holster is generated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 4A is a perspective view of an illustrative holster of the dispenser of FIG. 3.

FIG. 4B is a side plan view of the illustrative holster of the dispenser of FIG. 3.

FIG. 4C is a front plan view of the illustrative holster of the dispenser of FIG. 3.

Like reference symbols in the various drawings generally indicate like elements.

DETAILED DESCRIPTION

Figure 1:
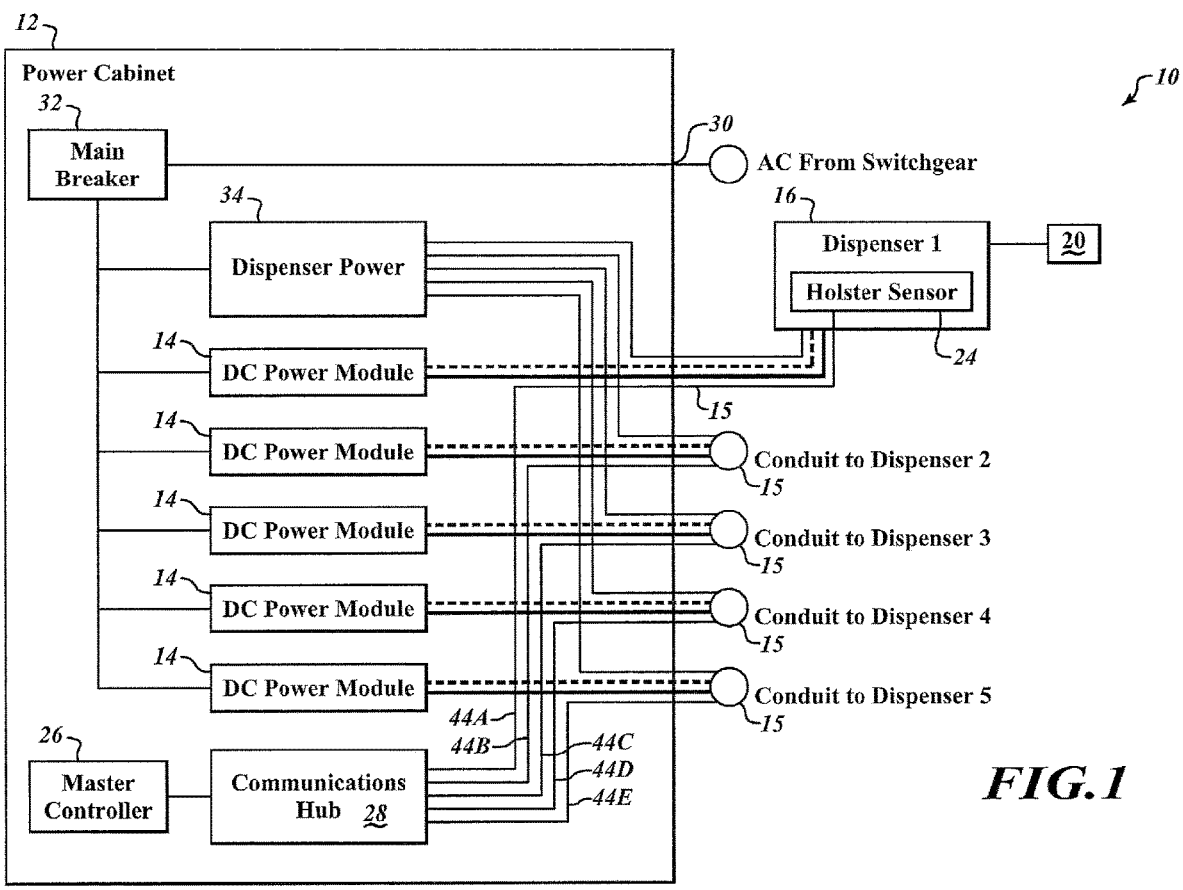
FIG. 1 is a block diagram of an illustrative Level 3 charging (DC fast charging) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative electrical power dispensers for electrical vehicle charging systems, charging systems, and methods of sensing presence of a charge coupler in a holster of an electrical power dispenser.

Figure 2:
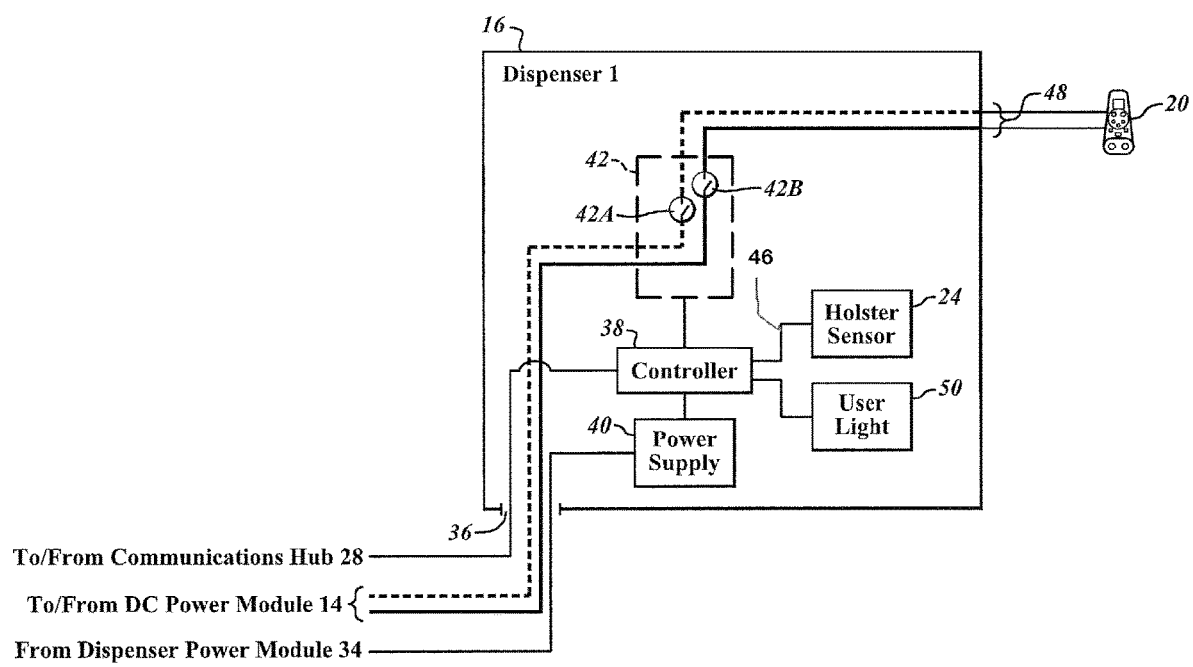
FIG. 2 is a block diagram of an illustrative electrical power dispenser of the system of FIG.
Figure 3:
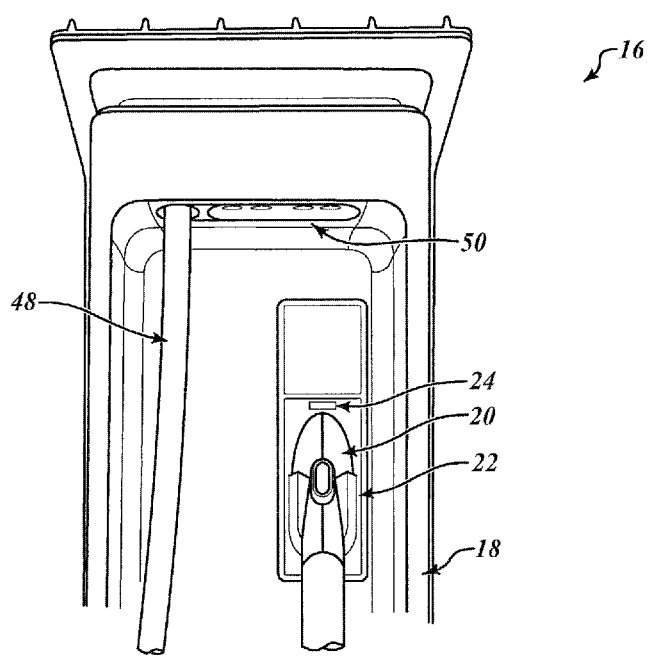
FIG. 3 is a perspective view of an illustrative electrical power dispenser of the system of FIG. 1.

Referring now to FIGS. 1, 2, and 3, in various embodiments an illustrative charging system 10 includes a power cabinet 12 having at least one direct current (DC) power module 14. An electrical power dispenser 16 is electrically coupled to the power cabinet 10. The dispenser 16 includes a housing 18. A charge coupler 20 is configured to dispense direct current electrical power. A holster 22 is disposed on the housing 18 and is configured to receive the charge coupler 20 therein. A holster sensor 24 is configured to sense presence of the charge coupler 20 in the holster 22 and is further configured to generate a signal indicative of presence of the charge coupler 20 in the holster 22.

Now that an overview has been set forth, illustrative details will be explained by way of examples that are given by way of illustration only and not of limitation.

Still referring now to FIGS. 1, 2, and 3, in various embodiments the power cabinet 12 has a master controller 26 that is coupled to a communications hub 28. At least one DC power module 14 converts alternating current (AC) electrical power from an AC electrical power input 30 which passes through a main breaker 32 before being sent to the DC power modules 14 and a dispenser power module 34 (which provides working power to various electronics in the dispenser 16).

In various embodiments, the power cabinet 12 may include up to five (5) DC power modules 14. It will be appreciated that, in various embodiments, the power cabinet 12 suitably may include, but is not limited to, an EVSE power cabinet. However, it will be appreciated that each power cabinet 12 may include any number of DC power modules 14 as desired for a particular application. In various embodiments, an output conduit 15 electrically connects each DC power module 14 to an associated electric power dispenser 16 that is configured to provide electrical power to a vehicle.

In various embodiments the master controller 26 is configured to control the power output of each of the DC power modules 14. In various embodiments, the power cabinet 12 may use isolated power modules 14 that combine to achieve peak power outputs in excess of 300 kW. In such embodiments, the power cabinet 12 has the capability to charge over 20 vehicles in an overnight dwell scenario.

As shown in FIG. 2, in various embodiments the dispenser 16 includes a conduit input 36, a controller 38, a power supply 40, the charge coupler 20, and a switching unit 42. The switching unit 42 includes switches 42A and 42B. The switching unit 42 may be controlled by the controller 38. The controller 38 and the switching unit 42 are configured to control providing control signals to and from the charge coupler 20 (via the switch 42A) and providing electrical power to the charge coupler 20 via the switch 42B.

In various embodiments the master controller 26 (FIG. 1) may be configured to generate control signals 44A, 44B, 44C, 44D, and 44E for the controller 38 of the dispensers 16 and thereby control the power output to each of the dispensers 16. Again, while five control signals are illustrated in this non-limiting example, it will be appreciated that any number of dispensers 16 and associated control signals may be used as desired for a particular application. The communications hub 28 may be configured to provide the controllers 38 with the control signals 44A, 44B, 44C, 44D, and 44E from the master controller 26. The communications hub 28 may also be configured with a communications network connection which may be wired or wireless. Each of the dispensers 16 may be individually addressed by the communications hub 28. Each of the dispensers 16 may also have dispenser identifiers associated therewith to facilitate communications (such as, without limitation, information regarding status of the holster 22 of any given dispenser 16) between the controller 38 (FIG. 2) and the communications hub 28.

In various embodiments the holster sensor 24 is configured to sense presence of the charge coupler 20 in the holster 22 and is further configured to generate a signal 46 that is indicative of presence of the charge coupler 20 in the holster 22. In various embodiments, the signal 46 is provided to the controller 38. In various embodiments the charge coupler 20 is electrically connected to the dispenser 16 via a cable 48. It will be appreciated that in various embodiments the cable 48 is a cable bundle that includes wiring that provides control signals to and from the charge coupler 20 and cabling that provides electrical power to the charge coupler 20.

In various embodiments the dispenser 16 includes a user light 50. In such embodiments, the user light 50 is activated (that is, lit) when the charge coupler 20 is out of its holster 22 and is deactivated (that is, off) when the charge coupler 20 is in its holster 22. In such embodiments, activation and deactivation of the user light 50 is controlled by the controller 38 and is responsive to the signal 46 that is indicative of presence of the charge coupler 20 in the holster 22. In such embodiments, activation of the user light 50 can provide visual feedback to a user that the charge coupler 20 is out of its holster 22.

Referring additionally to FIGS. 4A-4C, the holster 22 is configured to releasably receive the charge coupler 20 therein. In various embodiments, the holster 22 includes a frame 52 and a receptacle 54 that is disposed within the frame 52 and that is configured to releasably receive the charge coupler 20 therein. As discussed below, the holster sensor 24 is suitably disposed on the holster 24 to sense presence of the charge coupler 20 in the holster 22 in a location and manner as appropriate for the particular type of sensor chosen for use as the holster sensor 24. As discussed below, in some embodiments the holster sensor 24 may be disposed on the frame 52 and in some other embodiments the holster sensor 24 may be disposed on the receptacle 54.

It will be appreciated that the holster sensor 24 may include any suitable sensor as desired for a particular application. Given by way of non-limiting examples, in various embodiments the holster sensor 24 may include without limitation a load cell that includes a strain gauge, a proximity sensor, a contact switch, a radar sensor, an ultrasonic sensor, an optical sensor, and/or the like. While one holster sensor 24 is shown for purposes of clarity, it will be appreciated that more than one of the holster sensors 24 may be used as desired for a particular application. For example, in some applications more than one of the holster sensors 24 may be used to provide redundancy.

Referring additionally to FIGS. 5A-5D and as mentioned above, in some embodiments the holster sensor 24 may include without limitation a load cell 56 that includes a strain gauge 58. In such embodiments and as shown in FIGS. 4A-4C, the holster sensor 24 (that is, the load cell 56) is disposed on a top member 60 of the frame 52. In such embodiments and as shown in FIGS. 5A-5D, the strain gauge 58 includes an electrical conductor 62 that is disposed in a strain-sensitive pattern on a flexible backing 64 and that terminates at terminals 66 and 68. As the strain gauge 58 is deformed (such as by placement or removal of the charge coupler 20 in the holster 22), the electrical conductor 62 is deformed, thereby causing its electrical resistance to change.

Figures 5A, 5B, 5C, 5D:
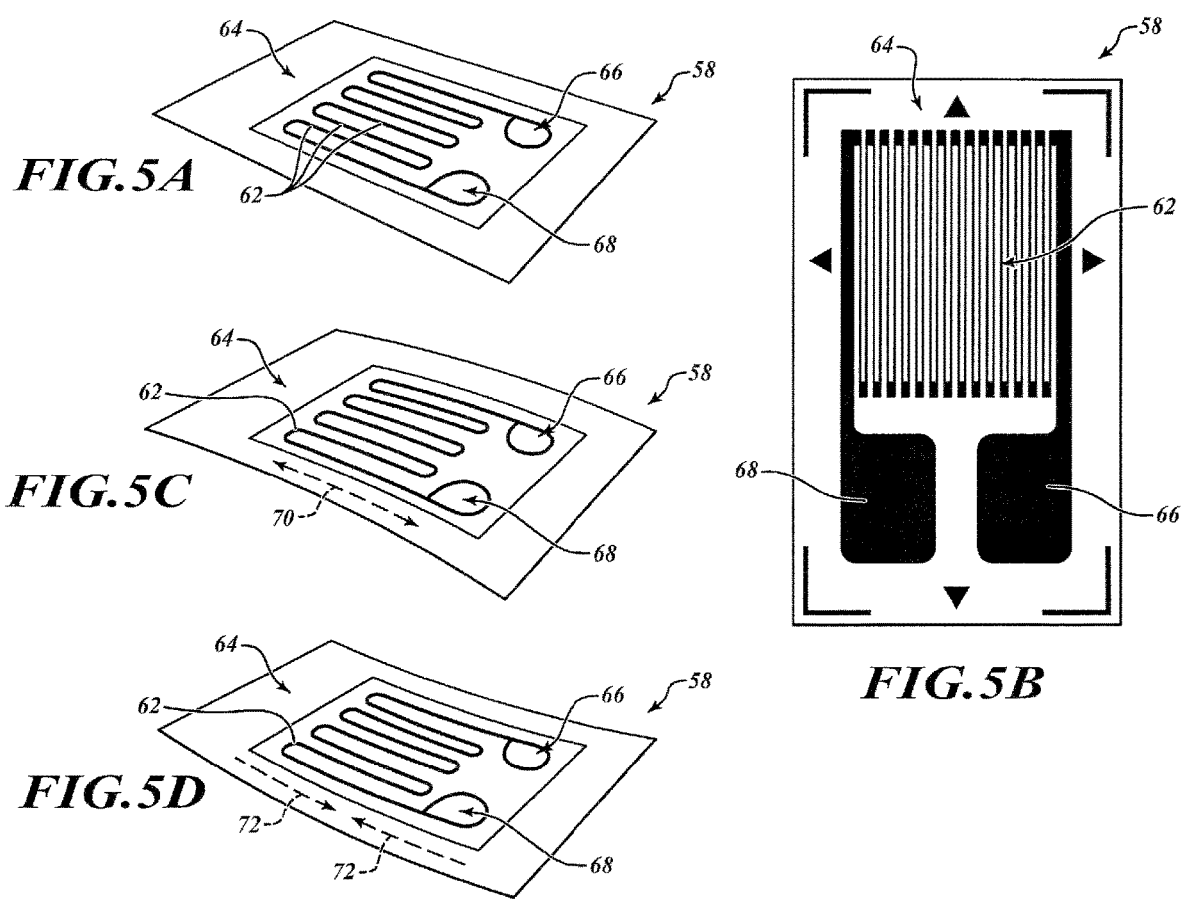
FIG. 5A is a perspective view of an illustrative strain gauge.
FIG. 5B is a top view of an illustrative strain gauge.
FIGS. 5C and 5D are perspective views of an illustrative strain gauge under tension and compression, respectively.

For example and as shown in FIG. 5C, when the charge coupler 20 is placed in the holster 22 the increase in weight in the holster 22 causes the load cell 56 to deflect downwardly. This downward deflection results in tension (as indicated by arrow 70) in the electrical conductor 62. As a result, the electrical conductor 62 becomes narrower and longer, thereby increasing resistance in the electrical conductor 62.

As another example and as shown in FIG. 5D, when the charge coupler 20 is removed from the holster 22 the decrease in weight in the holster 22 causes the load cell 56 to deflect upwardly. This upward deflection results in compression (as indicated by arrows 72) in the electrical conductor 62. As a result, the electrical conductor 62 becomes broader and shorter, thereby decreasing resistance in the electrical conductor 62.

In various embodiments this resistance change (whether an increase in resistance or a decrease in resistance) of the electrical conductor 62 suitably is measured in a known manner using a Wheatstone bridge (not shown) and is related to strain by a gauge factor given by $$GF = \frac{\Delta R / Rg}{\epsilon} \tag{1}$$

where

ΔR is change in resistance in the electrical conductor 62 caused by strain;

Rg is the resistance of the undeformed electrical conductor 62; and

∈ is strain.

It will be appreciated that the amount of strain may be inferred by the electrical resistance of the electrical conductor 62, thereby resulting in a determination of presence (or, conversely, absence) of the charge coupler 20 in the holster 22.

Figure 6A:
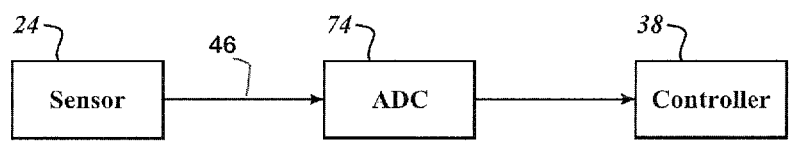
FIGS. 6A and 6B are block diagrams of components of the system of FIG. 1.

In such embodiments it will be appreciated that output of the strain gauge 58 is an analog signal. The analog signal may have a non-zero amplitude when the strain gauge 58 senses that the charge coupler 20 is in the holster 22 and a different non-zero amplitude when the strain gauge 58 senses that the charge coupler 20 is not in the holster 22. In such embodiments (and in some other embodiments as discussed below) and referring additionally to FIG. 6A, in various embodiments analog output of the holster sensor 24 is provided to an analog-to-digital converter (ADC) 74. The ADC 74 converts the analog output of the holster sensor 24 to a digital signal, which may be provided to, processed by, or simply further provided by the controller 38. In such embodiments, it will be appreciated that an un-holstered state of the charge coupler 20 results in a digital signal that is indicative of a logical "zero." It will be appreciated that in some embodiments the ADC 74 may be separate from the controller 38 and in some other embodiments the ADC 74 may be part of the controller 38.

Figure 6B:
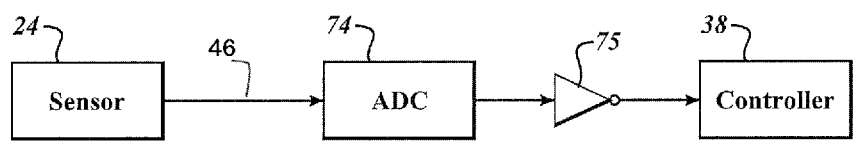

In some embodiments it may be desirable for an un-holstered state of the charge coupler 20 to result in a digital signal that is indicative of a logical "one." In such embodiments and referring additionally to FIG. 6B, output of the ADC 74 may be provided to an inverter 75. Output of the inverter 75 is, in turn, provided to the controller 38. It will be appreciated that in some embodiments the ADC 74 and/or the inverter 75 may be separate from the controller 38 and in some other embodiments the ADC 74 and/or the inverter 75 may be part of the controller 38.

Figure 7:
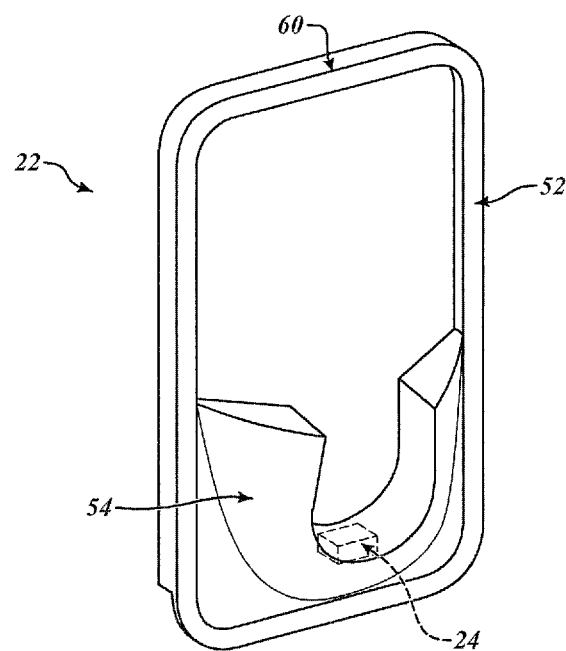
FIG. 7 is a perspective view of another illustrative holster of the dispenser of FIG. 3.

As mentioned above, in some embodiments the holster sensor 24 may be disposed on the receptacle 54. In some such embodiments and referring additionally to FIG. 7, the holster sensor 24 may include without limitation a proximity sensor, a contact switch, a radar sensor, an ultrasonic sensor, an optical sensor, or the like. In some such embodiments, it will be appreciated that the signal 46 may have a non-zero amplitude when the holster sensor 24 senses that the charge coupler 20 is in the holster 22 and zero amplitude when the holster sensor 24 senses that the charge coupler 20 is not in the holster 22. That is (and depending on the type of sensor used for the holster sensor 24), in some such embodiments the holster sensor 24 may not emit a signal when the holster sensor 24 does not sense that the charge coupler 20 is in the holster 22 and may only emit a signal when the holster sensor 24 senses that the charge coupler 20 is in the holster 22. In some embodiments, the ADC 74 only (FIG. 6A) may be used, as desired. In some other embodiments, the ADC 74 and the inverter 75 (FIG. 6B) may be used, as desired.

In some such embodiments, the holster sensor 24 may include a proximity sensor that is configured to detect presence of the charge coupler 20 without any physical contact between the charge coupler 20 and the holster sensor 24. In some such embodiments, the holster sensor 24 (that is, a proximity sensor) can emit an electromagnetic field or a beam of electromagnetic radiation (such as, without limitation, infrared radiation) and look for changes in the field or return signal to detect presence of the charge coupler 20 in and/or near the receptacle 54 of the holster 22. When such proximity is detected, the signal 46 is provided.

In some other such embodiments, the holster sensor 24 may include a contact switch that is configured to perform an electrical switch function by mechanically switching contact points of a physical (as opposed to semiconductor) electrical switch responsive to presence (or absence) of the holster sensor 24 in the receptacle 54 of the holster 22. In such embodiments, placement of the charge coupler 20 in the receptacle 54 causes mechanically switching of contact points to make physical and electrical contact of a physical switch, thereby providing the signal 46.

In some other such embodiments, the holster sensor 24 may include a radar (radio detection and ranging) sensor that is configured to detect, locate, track, and/or recognize the charge coupler 20 at proximal distances from the receptacle 54. In such embodiments, the radar sensor transmits electromagnetic energy toward the charge coupler 20 and detects echoes returned from the charge coupler 20, thereby providing the signal 46.

In some other such embodiments, the holster sensor 24 may include an ultrasonic sensor that is configured to generate, transmit, and receive ultrasound energy. In such embodiments, the holster sensor 24 measures time between sending a signal and receiving an echo. If the echo is received, then distance of the charge coupler 20 from the holster sensor 24 may be calculated and, as a result, presence of the charge coupler 20 in the holster 22 can be detected.

In some other such embodiments, the holster sensor 24 may include an optical sensor that is configured to convert light, or a change in light, into an electronic signal, such as the signal 46. Such an optical sensor may be configured to detect electromagnetic radiation from infrared wavelengths up to ultraviolet wavelengths. In such embodiments, the holster sensor 24 senses light, or a change in light, as the charge coupler 20 is removed from the holster 22 and as the charge coupler 20 is placed in the holster 22. The holster sensor 24 converts the light, or a change in light, into the signal 46.

In various embodiments information regarding presence of the charge coupler 20 in the holster 22 can be provided for reporting and/or analysis as desired. It will be appreciated that, as discussed below, such information can help contribute to incentivizing public users and can help aid fleet owners to incentivize fleet operators to replace the charge coupler 20 in its holster 22 in the dispenser 16 after use. It will be appreciated that replacing the charge coupler 20 in its holster 22 can prevent the charge coupler 20 and the cable 48 from lying on the ground, thereby helping contribute to possibly reducing occurrences of damage to or shorts in the charge coupler 20 and/or the cable 48.

Figure 8:
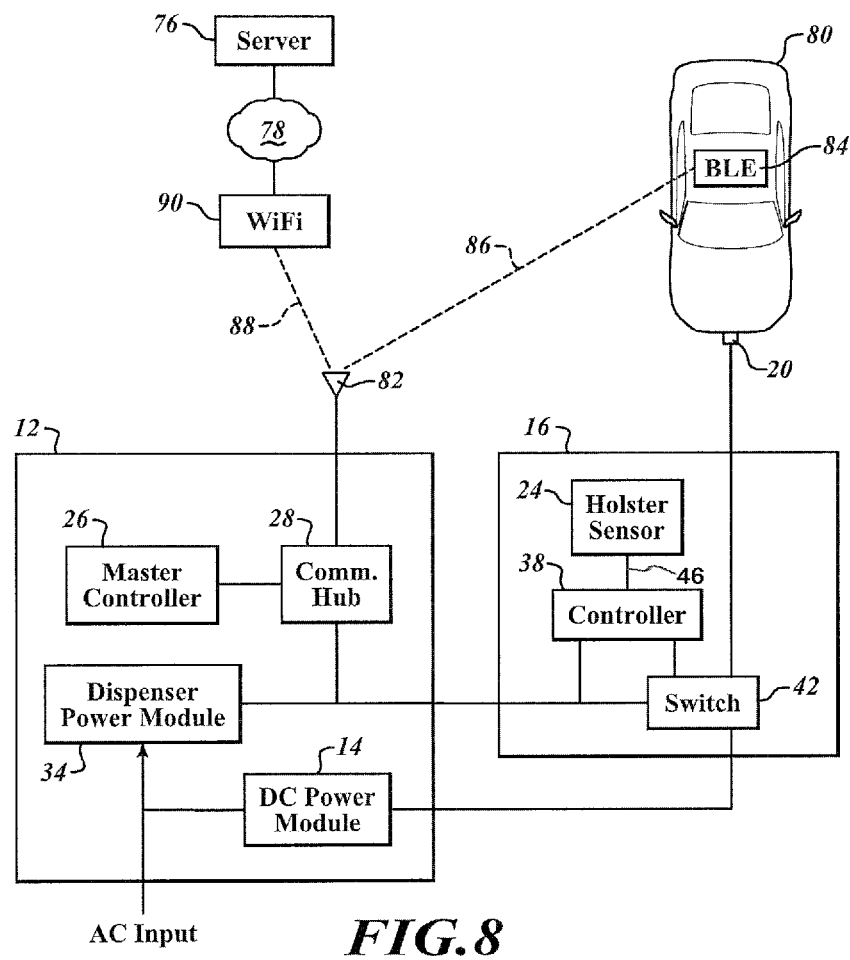
FIG. 8 is a block diagram in partial schematic form of an illustrative system including the Level 3 charging (DC fast charging) system of FIG. 1

To that end and referring additionally to FIG. 8, in various embodiments the communications hub 130 may be connected to and communicate with at least server 76 via a communications network 78. Only one DC power module 14 and only dispenser 16 are shown in FIG. 8 for purposes of clarity. However, it will be appreciated that any number of DC power modules 14 and dispensers 16 may be provided as described above.

As shown in FIG. 8, the charge coupler 20 is electrically connected (that is, plugged in) to a vehicle 80. As such, the charge coupler 20 is removed from its holster 22 (FIGS. 3, 4A-4C, and 7) and the holster sensor 24 senses that the charge coupler 20 is not in the holster 22. The generates the signal 46 that is indicative of presence (in this case, absence or a lack of presence) of the charge coupler 20 in the holster 22. As discussed above, in some embodiments the signal 46 may have a non-zero amplitude when the charge coupler 20 is sensed to be out of the holster 22 and in some other embodiments the signal 46 may have zero amplitude (or may not be generated by the holster sensor 24) when the charge coupler 20 is sensed to be out of the holster 22.

In various embodiments the communications hub may include a radio transceiver (not shown) and a radio frequency antenna 82 that is electrically connected to the radio transceiver. The radio transceiver may be configured to send and receive via various communication protocols including but not limited to Wi-Fi, Bluetooth, Bluetooth Low Energy (BLE), and the like. In some embodiments, the vehicle 80 may include a BLE transceiver 84 configured to communicate a vehicle identifier and any other information (such as, without limitation, identification of owner of a vehicle or identification of a user who is performing the charging operation) with the communications hub 28 via a BLE link 86. Further, the communications hub 28 may also communicate over a Wi-Fi link 88 with a Wi-Fi access point 90 that, in turn, communicates with one or more computer processors or one or more of the computer servers 76 over the communications network 78 such as but not limited to the Internet.

Thus, in various embodiments the communications network is configured to receive the information indicative of presence of the charge coupler 20 in the holster 22 from the communications hub 28 and to provide the information indicative of presence of the charge coupler 20 in the holster 22 to the server(s) 76. In some such embodiments the server(s) 76 is further configured to analyze the information indicative of presence of the charge coupler 20 in the holster 22. For example, in some embodiments the server(s) 76 may be further configured to correlate the information indicative of presence of the charge coupler 20 in the holster 22 with information indicative of identification of an entity, such as an owner of a vehicle or a user of a vehicle. Such information may be communicated via the BLE link 86. As another example, in some embodiments the server(s) 76 may be further configured to identify an entity, such as an owner of a vehicle or a user of a vehicle, who does not return the charge coupler 20 to the holster 22 after use.

In various embodiments the information indicative of presence of the charge coupler 20 in the holster 22, the information indicative of identification of an entity, such as an owner of a vehicle or a user of a vehicle, and the information indicative of identity of an entity, such as an owner of a vehicle or a user of a vehicle, who does not return the charge coupler 20 to the holster 22 after use may be used to incentivize an owner of a vehicle or a user of a vehicle to return the charge coupler 20 to the holster 22 after use. For example, consistent or repeated or frequent replacement of the charge coupler 20 in the holster 22 may result in an owner of a vehicle or a user of a vehicle receiving positive reinforcement, such as without limitation a billing credit or discount or gamification points or awards. As another example, isolated or infrequent failure to replace the charge coupler 20 in the holster 22 may result in an owner of a vehicle or a user of a vehicle receiving a reminder to replace the charge coupler 20 in the holster 22. As discussed above, in various embodiments a charge session can entail communicating identification of a user to the server(s) 76. In such embodiments, the server(s) 76 can cause various types of communications to be sent to the user via various communication methodologies, such as without limitation text message, Email message, smart phone application ("app"), communication to the vehicle itself via Bluetooth, phone call, or the like. As another example, in some embodiments, if desired, consistent or repeated or frequent failure to replace the charge coupler 20 in the holster 22 may result in an owner of a vehicle or a user of a vehicle receiving a billing surcharge or termination of ability to charge.

It will be appreciated that various disclosed systems, equipment, and methods may be suited for charging large numbers of vehicles, such as but not limited to fleet vehicles. For example, it may be beneficial to have a fleet of delivery trucks that all charge during overnight hours and that are deployed during the day for deliveries. In such cases disclosed embodiments can help contribute to reducing the number of charging power cabinets entailed, thereby helping contribute to saving cost and space within the refueling (recharging) structure. Similarly, such systems may be applied in parking garages located in or near buildings where people work or at entertainment or shopping venues where a large number of vehicles may be charged during a time period during which the vehicles are not being used.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An electrical power dispenser for an electrical vehicle charging system, the electrical power dispenser comprising:
    a housing;
    a charge coupler configured to dispense direct current electrical power;
    a holster comprising a receptacle disposed within a frame disposed on the housing and configured to receive the charge coupler in the frame and the receptacle; and
    a holster sensor comprising a load cell disposed on one of the receptacle and the frame configured to sense presence of the charge coupler in the holster and further configured to generate a signal indicative of presence of the charge coupler in the holster.

2. The dispenser of claim 1, wherein the load cell is chosen from a strain gauge, a proximity sensor, a contact switch, a radar sensor, an ultrasonic sensor, and an optical sensor.

3. The dispenser of claim 1, further comprising electrical circuitry electrically coupled to the holster sensor and configured to provide digitized information indicative of presence of the charge coupler in the holster.

4. The dispenser of claim 3, further comprising an analog-to-digital converter configured to convert an analog signal from the holster sensor to a digital signal.

5. The dispenser of claim 4, further comprising an inverter configured to invert output of the analog-to-digital converter.

6. A charging system, comprising:
    a power cabinet having at least one direct current power module; and
    an electrical power dispenser electrically coupled to the power cabinet, the dispenser including:
    a housing;
    a charge coupler configured to dispense direct current electrical power;
    a holster comprising a receptacle disposed within a frame disposed on the housing and configured to receive the charge coupler in the frame and the receptacle; and
    a holster sensor comprising a load cell disposed on one of the receptacle and the frame configured to sense presence of the charge coupler in the holster and further configured to generate a signal indicative of presence of the charge coupler in the holster.

7. The charging system of claim 6, wherein the load cell is chosen from a strain gauge, a proximity sensor, a contact switch, a radar sensor, an ultrasonic sensor, and an optical sensor.

8. The charging system of claim 6, further comprising electrical circuitry electrically coupled to the holster sensor and configured to provide information indicative of presence of the charge coupler in the holster.

9. The charging system of claim 8, further comprising an analog-to-digital converter configured to convert an analog signal from the holster sensor to a digital signal.

10. The dispenser of claim 9, further comprising an inverter configured to invert output of the analog-to-digital converter.

11. The charging system of claim 8, further comprising a communications hub electrically coupled to the electrical circuitry.

12. The charging system of claim 11, wherein the communications hub is configured to communicate with a server.

13. A system, comprising:
a power cabinet including:
at least one direct current power module; and
a communications hub;
an electrical power dispenser electrically coupled to the power cabinet, the dispenser including:
a housing;
a charge coupler configured to dispense direct current electrical power;
a holster comprising a receptacle disposed within a frame disposed on the housing and configured to receive the charge coupler in the frame and the receptacle;
a holster sensor comprising a load cell disposed on one of the receptacle and the frame configured to sense presence of the charge coupler in the holster and further configured to generate a signal indicative of presence of the charge coupler in the holster; and
electrical circuitry electrically coupled to the holster sensor and configured to provide to the communications hub the information indicative of presence of the charge coupler in the holster; and
at least one server configured to receive from the communications hub the information indicative of presence of the charge coupler in the holster.

14. The system of claim 13, further comprising a communications network configured to receive the information indicative of presence of the charge coupler in the holster from the communications hub and to provide the information indicative of presence of the charge coupler in the holster to the at least one server.

15. The system of claim 13, wherein the at least one server is further configured to analyze the information indicative of presence of the charge coupler in the holster.

16. The system of claim 15, wherein the at least one server is further configured to correlate the information indicative of presence of the charge coupler in the holster with information indicative of identification of an entity chosen from an owner of a vehicle and a user of a vehicle.

17. The system of claim 16, wherein the at least one server is further configured to identify an entity chosen from an owner of a vehicle and a user of a vehicle who does not return the charge coupler to the holster after use.

18. The charging system of claim 13, wherein the holster sensor includes a sensor chosen from at least one strain gauge, a proximity sensor, a contact switch, a radar sensor, an ultrasonic sensor, and an optical sensor.

19. The charging system of claim 13, further comprising an analog-to-digital converter configured to convert an analog signal from the holster sensor to a digital signal.

20. The dispenser of claim 19, further comprising an inverter configured to invert output of the analog-to-digital converter.

* * * * *